(12) United States Patent  
Kuhnert et al.

(10) Patent No.: US 8,536,769 B2  
(45) Date of Patent: Sep. 17, 2013

(54) PRECHAMBER SPARK PLUG

(75) Inventors: Dieter Kuhnert, Sinsheim (DE); Georg Maul, Bad Wurzach (DE); Uwe Sailer, Sinsheim (DE)

(73) Assignee: DKT Verwaltungs-GmbH, Sinsheim (DE)

( * ) Notice: Subject to any disclaimer, the term of this patent is extended or adjusted under 35 U.S.C. 154(b) by 292 days.

(21) Appl. No.: 13/166,599

(22) Filed: Jun. 22, 2011

(65) Prior Publication Data

US 2012/0025689 A1   Feb. 2, 2012

(30) Foreign Application Priority Data

Jul. 27, 2010   (DE) .................. 10 2010 032 412

(51) Int. Cl.
*H01T 13/20*   (2006.01)

(52) U.S. Cl.
USPC ........... 313/140; 313/139; 313/141; 313/142; 123/136 EL

(58) Field of Classification Search
None
See application file for complete search history.

(56) References Cited

U.S. PATENT DOCUMENTS

| 5,554,908 A | 9/1996 | Kuhnert et al. |
| 5,793,793 A | 8/1998 | Matsutani et al. |
| 6,337,533 B1 | 1/2002 | Hanashi et al. |
| 8,324,792 B2 * | 12/2012 | Maul et al. ............ 313/141 |
| 2011/0212702 A1 * | 9/2011 | Howard et al. .......... 455/404.2 |

* cited by examiner

*Primary Examiner* — Ashok Patel

(57) ABSTRACT

The invention refers to a prechamber spark plug comprising an ignition electrode with several electrode arms. The ignition electrode is made of a cross-shaped blank that is cut out of sheet metal and then the electrode arms are set upright by bending. The sheet metal is made of iridium or an iridium-based alloy by rolling in a rolling direction and the ignition electrode blank is cut out in such a way that an angle of 50° or less is present between each of the electrode arms and the rolling direction (W).

15 Claims, 3 Drawing Sheets

PRECHAMBER SPARK PLUG

The invention refers to a prechamber spark plug.

U.S. Pat. No. 5,554,908 discloses a prechamber spark plug comprising a housing, which includes a prechamber comprising a plurality of openings on its front end. An arc discharge can ignite a fuel-air mixture in the prechamber, so that a burning gas mixture comes out of the openings of the prechamber as so-called torch rays and ignites the fuel-air mixture in the combustion chamber of an engine.

An isolator is provided in the housing of a prechamber spark plug, which isolator carries a middle electrode. The middle electrode is also sometimes referred to as an electrode carrier in the case of prechamber spark plugs, since it carries an ignition electrode arranged in the prechamber. The ignition electrode has several, generally four, electrode arms, which extend at first radially to the outside starting from the middle electrode and run along a prechamber wall with a subsequent section. This front section of the electrode arms forms between itself and the prechamber wall a spark gap for an arc discharge. The prechamber wall may include protrusions directed inwardly, for example ridges, facing the electrode arms. The spark gap for the arc discharge is also in such a case between the front section of the electrode arms and of the prechamber wall, more precisely between the electrode arm and the wall protrusion.

An advantage of prechamber spark plugs is their long operating life and a very good ignition behaviour in comparison to other types of spark plugs. These advantages are due among other things to the fact that the ignition electrode comprises several electrode arms, each being able to generate an arc discharge.

From U.S. Pat. No. 5,554,908 it is known that the ignition electrode of a prechamber spark plug can be made of metals among the platinum group or alloys thereof by punching a cruciform ignition electrode blank having four electrode arms out of sheet metal and then raising the arms upright by bending. Platinum and platinum-based alloys are sufficiently bendable to enable such a production process without any problems.

SUMMARY OF THE INVENTION

An object of the present invention is to show how the service life of prechamber spark plugs can be improved even further in a cost-efficient manner.

According to the invention, the ignition electrode is made of iridium or an iridium-based alloy. An iridium-based alloy is an alloy which contains at least 50% in weight iridium. The use of iridium-based alloys for spark plugs fitted with a pin-shaped middle electrode and a hook-shaped mass electrode is known from U.S. Pat. No. 6,337,533. Electrodes made of iridium-based alloys have an advantageously high melting point and are therefore wear resistant.

However, the advantageously high melting point of iridium and iridium-based alloys is associated with a significant brittleness. This is not a problem for pin- or hook-shaped electrodes since pins or platelets made of iridium-based alloys can be mounted as electrodes easily. The manufacture of ignition electrodes as punched and bent parts disclosed in U.S. Pat. No. 5,554,908 however requires a working step which presupposes flexibility of material.

If one wishes to produce ignition electrodes for prechamber spark plugs out of a cross-shaped ignition electrode blank by setting the electrode arms thereof upright in a bending step, the use of iridium or iridium-based alloys causes the problem, that electrode arms break during bending or that cracks occur at the bending point, which cause failure of the ignition electrode within a short time.

To use the advantages of iridium-based alloys for ignition electrodes of prechamber spark plugs, it could be envisioned to avoid the problematic bending of sheet metal. For instance, an electrode cross might be made of round wire, since round wire lends itself to bending better than sheet metal. Another possibility might be to avoid the bending step altogether, by assembling the ignition electrode of strip-shaped sections or casting it. Such measures however involve increased production costs.

According to the invention the ignition electrode blank is cut out of sheet metal in such a way that an angle of 50° or less is present between the rolling direction and each of the electrode arms and makes it possible to produce an ignition electrode without additional production costs, even made of brittle iridium-based alloys.

It has been recognised in the context of the invention, that for sheet metal the flexibility depends on the rolling direction. The rolling direction is the direction in which the sheet metal was rolled during production. It has been found that the flexibility is the worst when the bending axis is parallel to the rolling direction, i.e. when an electrode arm extends perpendicular to the rolling direction. A characteristic rolling texture is generated during the rolling of sheet metal, which in many cases is readily visible to the naked eye on the surface. But a rolling texture can also be seen in an anisotropic microstructure and/or the orientation of crystal grains. Each rolling texture has therefore a direction, that is to say the rolling direction.

In a manufacturing process according to the invention, the contour of an ignition electrode blank to be cut out of the sheet metal is oriented in relation to the rolling direction in such a way that an angle of 50° or less is present between the rolling direction and each of the electrode arms. For instance, in a process according to the invention, the rolling direction of a sheet metal can be determined first of all and then a cutting tool for cutting out the ignition electrode blank in relation to the rolling direction be oriented in such a way that an angle of 50° or less is present between the rolling direction and each of the electrode arms.

By taking the rolling direction into consideration when the ignition electrode blank is cut out of sheet metal, the flexibility required for setting upright the electrode arms can be obtained even with electrode arms which are arranged at right angles relative to one another. If the rolling direction bisects the angle between electrode arms arranged at right angles relative to one another, there is an angle of only 45° between each of the arms and the rolling direction. For an ignition electrode blank with electrode arms arranged at right angles relative to one another, an angle of 45° is optimal between each of the arms and the rolling direction. But angles of up to 50° still enable a sufficient flexibility of the electrode arms.

The flexibility of the electrode arms can be further improved if as the angle between the rolling direction and each of the arms and is reduced even more. It is particularly preferable that an angle of 35° or less is present between each of the electrode arms and the rolling direction, preferably 30° or less. This can be achieved if the ignition electrode blank is not cut out as a right-angled cross, but has the form of a cross, which consists of two strips intersecting under an angle of less than 90°. For instance, the ignition electrode blank can have the form of a cross, which consists of two strips, intersecting under an angle of for instance 60° or less. The ignition electrode blank may be cut out in such a way that an angle of 30° or less is present between each of the electrode arms and the rolling direction.

An iridium-based alloy can be used as a material for the ignition electrode, which contains at least 70% iridium in weight, e.g. the ignition electrode may be made of an alloy containing at least 80% iridium in weight. For example, the ignition electrode may consist of 90% iridium in weight or more. An iridium-based alloy with 95% in weight iridium or more can be used. Iridium-based alloys with high iridium content have an advantageously high melting point. For enhanced chemical resistance, osmium and/or hafnium can be mixed to the iridium-based alloys. Iridium-based alloys containing at least 1% in weight, preferably at least 2% in weight of osmium and/or hafnium are advantageous. Such an iridium-based alloy then contains 1% in weight or more, e.g. 2% in weight or more, of an alloying additive, which consists altogether of osmium or altogether of hafnium or is altogether made of an osmium-hafnium mixture. Further alloying additions can be mixed to the iridium-based alloy, in particular rhenium and/or molybdenum, for instance 0.5 to 2% in weight rhenium and/or 0.5 to 1% in weight molybdenum.

The thickness of sheet metal out of which that the ignition electrode blank is cut out, may range from 0.1 to 0.5 mm, for example.

The ignition electrode blank can for instance be cut out of the sheet metal by punching, spark erosion or laser beam cutting. In a punched out ignition electrode blank, the electrode arms are preferably raised in the punching direction. In this manner, an impairment of the bending process by ridges that might be caused by the punching process can be minimised.

The rolling texture of an ignition electrode produced according to the invention can be eliminated by an annealing treatment. The present invention therefore also concerns a prechamber spark plug fitted with a housing, which includes a prechamber comprising a plurality of openings on its front end, an isolator arranged in the housing, a middle electrode surrounded by the isolator, which carries an ignition electrode arranged in the prechamber and comprising several electrode arms made of sheet metal, wherein the electrode arms each have a rear section, extending away from the middle electrode, and a front section running along a prechamber wall, which forms a spark gap between itself and the prechamber wall, whereas an angle is enclosed between each of the adjoining electrode arms, which angle deviates from a right angle by at least 20°, e.g. 30° or more.

BRIEF DESCRIPTION OF THE DRAWINGS

Further details and advantages of the present invention can be seen in exemplary embodiments with reference to the appended drawings. Identical and correlating parts are designated with matching reference numbers.

DETAILED DESCRIPTION

Figure 1:
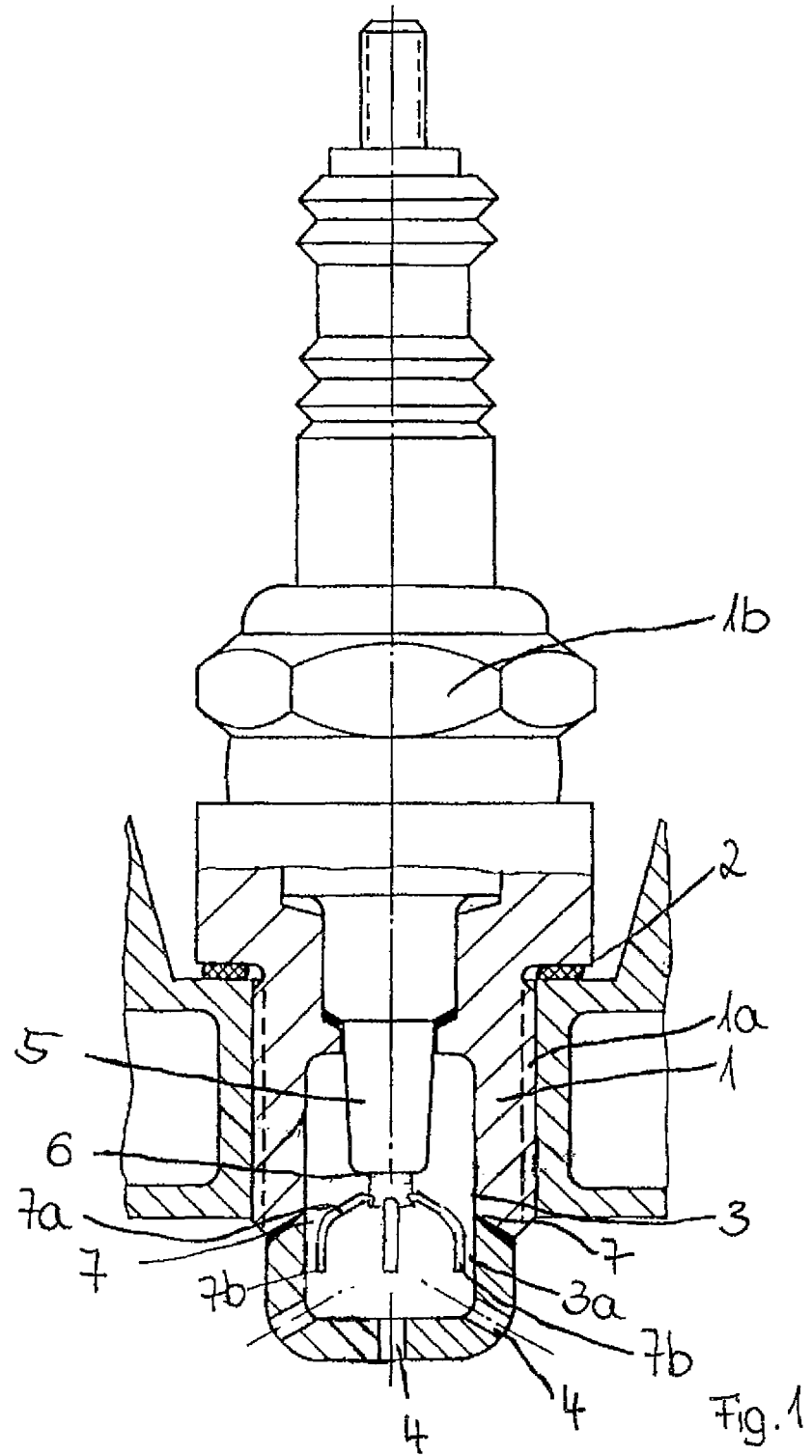
FIG. 1 shows an exemplary embodiment of a prechamber spark plug.

FIG. 1 shows an exemplary embodiment of a prechamber spark plug screwed into the cylinder head of an engine. The prechamber spark plug comprises a housing 1 having a screw-in thread 1a and a hexagon 1b. A washer 2 is pressed in between the housing 1 and the cylinder head as a seal.

The housing 1 has a prechamber 3 comprising a plurality of openings 4 on its front end. Inside the housing 1 an isolator 5, for instance made of aluminium oxide or another ceramic material, is arranged. The isolator 5 encloses a middle electrode 6. The middle electrode 6 carries an ignition electrode arranged in the prechamber 3, which comprises several electrode arms 7. The electrode arms 7 each have a rear section 7a, which extends radially starting from the middle electrode 6, and a forward facing front section 7b, running along a lateral prechamber wall 3a. Between the prechamber wall 3a and the front section 7b of the electrode arms is a spark gap.

Figure 2:
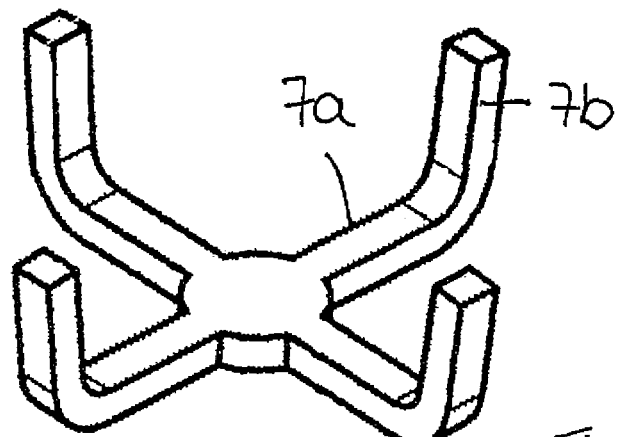
FIG. 2 illustrates an ignition electrode of the prechamber spark plug shown in FIG. 1.
Figure 3:
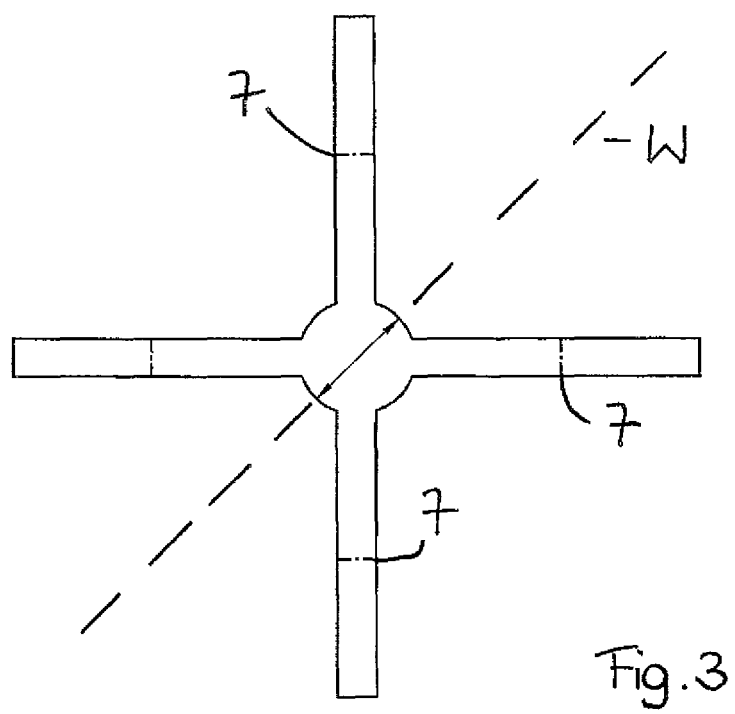
FIG. 3 shows an exemplary embodiment of an ignition electrode blank, out of which the ignition electrode illustrated on FIG. 2 is produced.

In the illustrated exemplary embodiment, the ignition electrode has four cross-shaped electrode arms 7. The ignition electrode is represented separately on FIG. 2 and consists of an iridium-based alloy. The ignition electrode is made of sheet metal. The sheet metal is by rolling in a single rolling direction produced. Then an ignition electrode blank is cut out of the sheet metal. An example of an ignition electrode blank is represented on FIG. 3.

The rolling direction should be taken into consideration when cutting out the ignition electrode blank. Usually the rolling direction of sheet metal can be determined by the naked eye since the sheet metal surface has typically a texture running in the rolling direction. The rolling direction of sheet metal can also be seen in the microstructure of the material and/or the orientation of the crystal grains. It should be noted that the rolling of sheet metal creates a so-called rolling texture, which has a direction, that is to say the rolling direction.

The rolling direction of the sheet metal is determined and then an ignition electrode blank is cut out of the sheet metal in such a way, that an angle of 45° or less is present between the rolling direction and each of the electrode arms 7. The rolling direction is referred to as line W on FIG. 3. An angle of 45° is clearly present between the rolling direction W and each of the electrode arms 7.

After cutting out the ignition electrode blank, the latter may be annealed, to release the tensions. But an annealing step is not required.

An ignition electrode can be formed out of the electrode blank by bending the electrode arms 7 into an upright position. The bending can be performed during annealing or take place at room temperature.

The electrode arms 7 are not set upright vertically, but the front section 7b of the electrode arms 7 is only bent by an acute angle with reference to the rear section 7a, for instance by an angle of 82° to 88°. In this manner, the bending load can be reduced and the distance required for a spark gap can be better achieved between the front section 7b of the electrode arms 7 and of a surrounding prechamber wall. The bending radius should not be selected too small, in order to reduce the bending load as much as possible. The electrode arms should have a bending radius of 1 mm to 3 mm between the rear section 7a and the front section 7b. The thickness of the sheet metal used for producing the ignition electrode should be smaller than the width of the electrode arms 7. Sheet metal thicknesses between 0.1 and 0.5 mm for instance are suitable.

Figure 4:
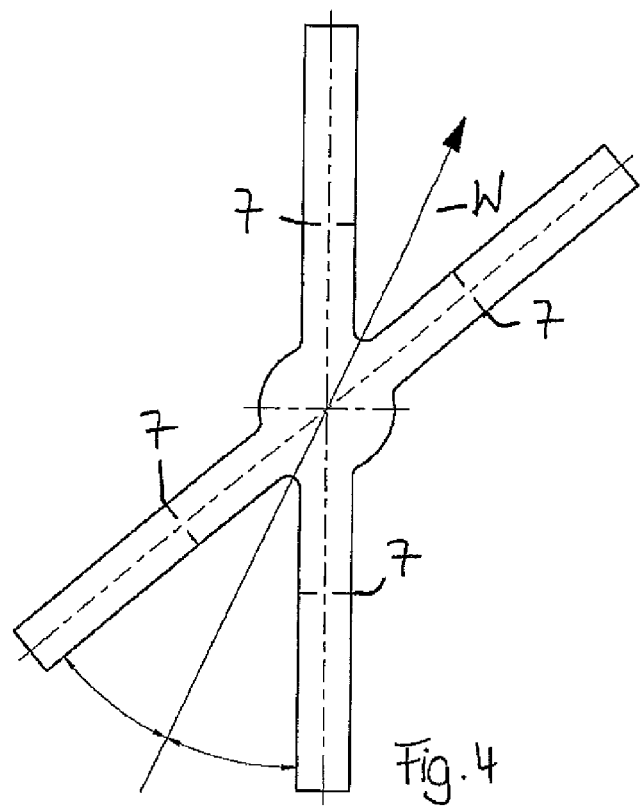
FIG. 4 shows further exemplary embodiment of an ignition electrode blank according to the invention.
Figure 5:
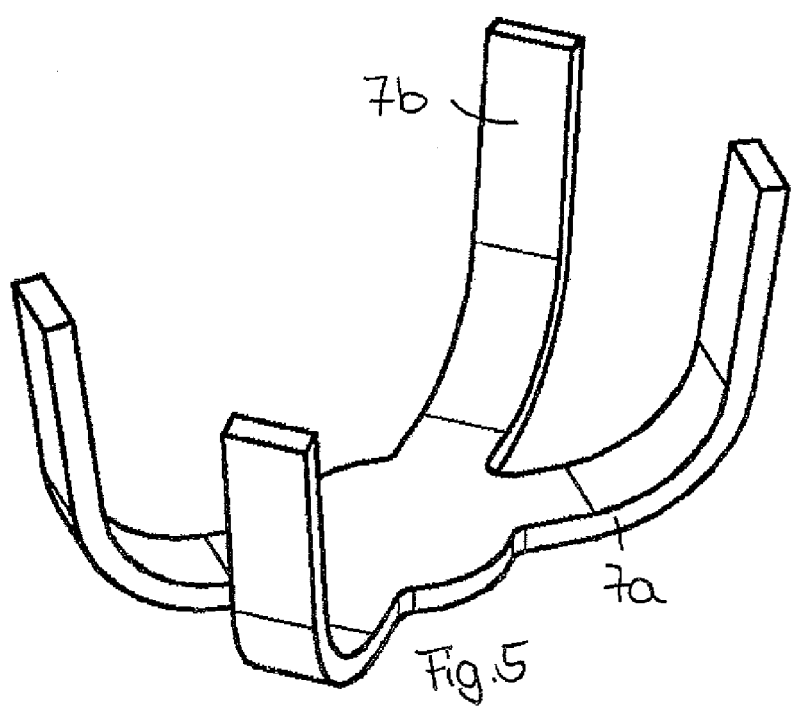
FIG. 5 shows an ignition electrode made of the ignition electrode blank illustrated on FIG. 4.

FIG. 4 shows a further embodiment of an ignition electrode blank. The ignition electrode blank illustrated on FIG. 4 differs from the ignition electrode blank above described only in that the four electrode arms 7 are not arranged at right angles relative to one another. The angles between adjoining electrode arms 7 each deviate by more than 30° from a right angle. The embodiment illustrated in FIG. 4 therefore shows an angle of less than 35° between each of the electrode arms 7 and the rolling direction W, preferably less than 30°.

Figure 6:
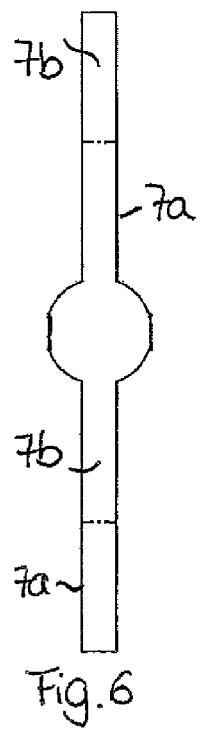
FIG. 6 shows an exemplary embodiment of an ignition electrode blank.

FIG. 6 shows another embodiment of an ignition electrode blank. The peculiarity of this ignition electrode blank consists in that it only has two electrode arms 7. The rolling direction can therefore include a particularly small angle with the electrode arms 7, in particular, the rolling direction can run parallel to the electrode arms 7. An ignition electrode with only two electrode arms 7 can be produced out of such an ignition electrode blank. It is also possible to use two such ignition electrode blanks for an ignition electrode, which blanks are installed on top of one another, for instance welded on top of one another after setting upright the electrode arms 7.

The ignition electrode can be welded on the middle electrode 6. A particularly reliable fastening to the middle electrode 6 can be achieved by embedding the ignition electrode in the middle electrode 6. To do so, the material of the middle electrode 6 is fused and the ignition electrode pressed into the fused material of the middle electrode 6. The ignition electrode can thus be held firmly by the middle electrode, ideally even be held in positive engagement. The ignition electrode is in so doing pressed into the middle electrode 6 so far until the electrode arms 7 come out of a lateral surface of the middle electrode 6. Contrary to a welding process, the material of the ignition electrode need not be fused with such a fastening of the ignition electrode to the middle electrode 6.

REFERENCE SIGNS

1 Housing
1a Screw-in thread
1b Hexagon
2 Plain washer
3 Prechamber
3a Prechamber wall
4 Opening
5 Isolator
6 Middle electrode
7 Electrode arms
7a Rear section
7b Front section
W Rolling direction

What is claimed is:

1. A prechamber spark plug comprising:
a housing, having a prechamber with a plurality of openings,
an isolator arranged in the housing,
a middle electrode surrounded by the isolator,
said middle electrode supporting an ignition electrode in the prechamber, said ignition electrode comprising several electrode arms made of sheet metal, having a rolling texture with a rolling direction,
said electrode arms each having a rear section and a front section, said front section running along a prechamber wall and forming a spark gap between itself and the prechamber wall or between itself and a prechamber wall protrusion,
the ignition electrode comprising iridium or an iridium-based alloy, and
a rolling texture of each electrode arm having a rolling direction enclosing an angle of 50° or less with respect to a longitudinal direction of a corresponding electrode arm.

2. The prechamber spark plug according to claim 1, wherein the longitudinal direction of each electrode arm encloses, with the direction of the rolling texture, an angle of 35° or less.

3. The prechamber spark plug according to claim 1, wherein the ignition electrode consists of two or several sheet metal strips arranged over one another.

4. The prechamber spark plug according to claim 1, wherein each electrode arm encloses with a neighboring electrode arm an angle that deviates from a right angle by at least 20°.

5. The prechamber spark plug according to claim 1, wherein the ignition electrode is made of an iridium-based alloy, having at least 70% in weight of iridium.

6. The prechamber spark plug according to claim 1, wherein the ignition electrode is made of an iridium-based alloy, having at least 90% in weight of iridium.

7. The prechamber spark plug according to claim 1, wherein the ignition electrode is made of an iridium-based alloy, having at least 0.5% in weight of osmium.

8. The prechamber spark plug according to claim 1, wherein the ignition electrode is made of an iridium-based alloy, having at least 0.5% in weight of hafnium.

9. The prechamber spark plug according to claim 1, wherein a bend of each electrode arms between the rear section and the front section has a bending radius of at least 1 mm and at most 3 mm.

10. The prechamber spark plug according to claim 1, wherein the front section of each electrode arm is bent by an acute angle with respect to the rear section.

11. The prechamber spark plug according to claim 1, wherein the front section of each electrode arm is bent with respect to the rear section by an angle of between about 82° to 88°.

12. The prechamber spark plug according to claim 1, wherein the ignition electrode is made of an iridium-based alloy, having at least 0.5% in weight of rhenium.

13. The prechamber spark plug according to claim 1, wherein the ignition electrode is made of an iridium-based alloy, having at least 0.5% in weight of molybdenum.

14. A prechamber spark plug comprising
a housing, having a prechamber with a plurality of openings,
an isolator arranged in the housing,
a middle electrode surrounded by the isolator,
said middle electrode supporting an ignition electrode arranged in the prechamber, said ignition electrode comprising four electrode arms,
said electrode arms each having a rear section and a front section, said front section running along a prechamber wall and forming a spark gap between itself and the prechamber wall or between itself and a prechamber wall protrusion,
the ignition electrode comprising of iridium or an iridium-based alloy, and
wherein the ignition electrode comprises a cross cut out of sheet metal, said cross being formed by two lines intersecting at an acute angle.

15. A prechamber spark plug comprising
a housing, having a prechamber with a plurality of openings,
an isolator arranged in the housing,
a middle electrode surrounded by the isolator,
said middle electrode supporting an ignition electrode arranged in the prechamber, said ignition electrode being made of sheet metal and comprising four electrode arms,
said electrode arms each having a rear section and a front section, said front section running along a prechamber wall and forming a spark gap between itself and the prechamber wall or between itself and a prechamber wall protrusion, the ignition electrode comprising iridium or an iridium-based alloy, and wherein neighboring electrode arms enclose an angle that differs by at least 30° from a right angle.

* * * * *